L. R. ROBERTS.
AUTOMATIC TYPE WRITER OPERATOR.
APPLICATION FILED JUNE 8, 1916.
1,252,846.
Patented Jan. 8, 1918.
8 SHEETS—SHEET 5.
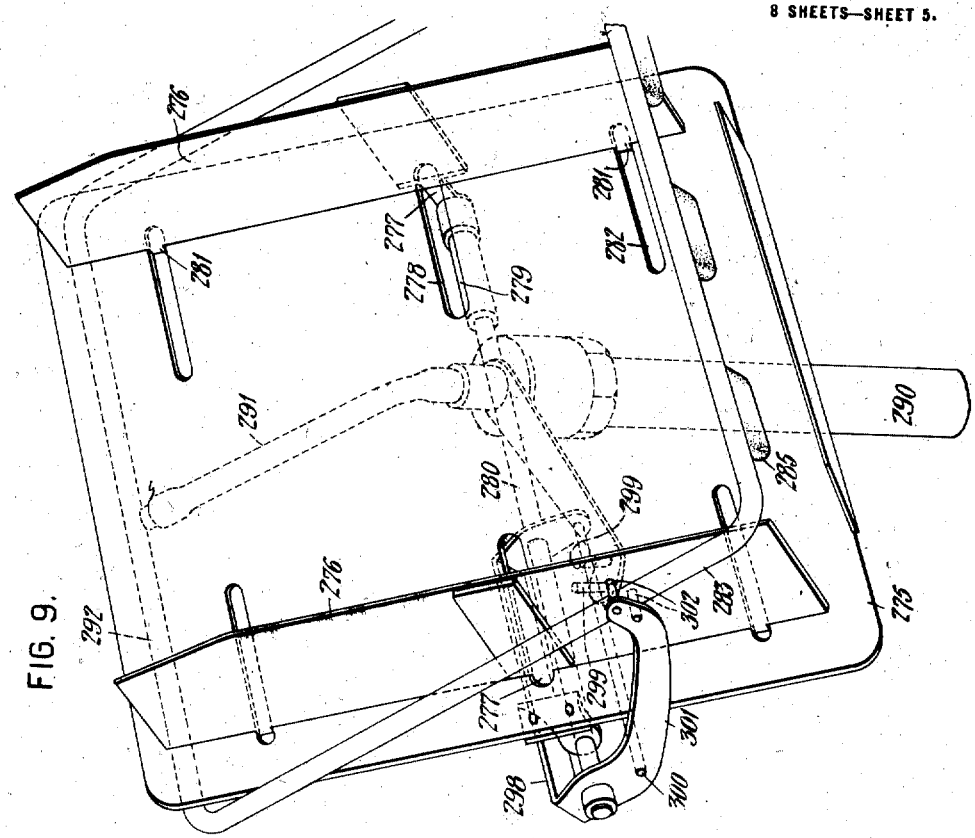
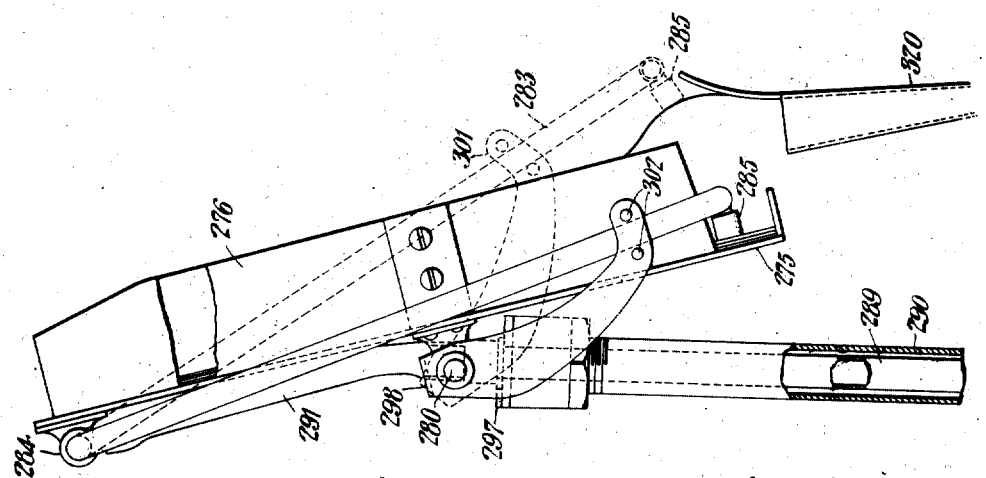

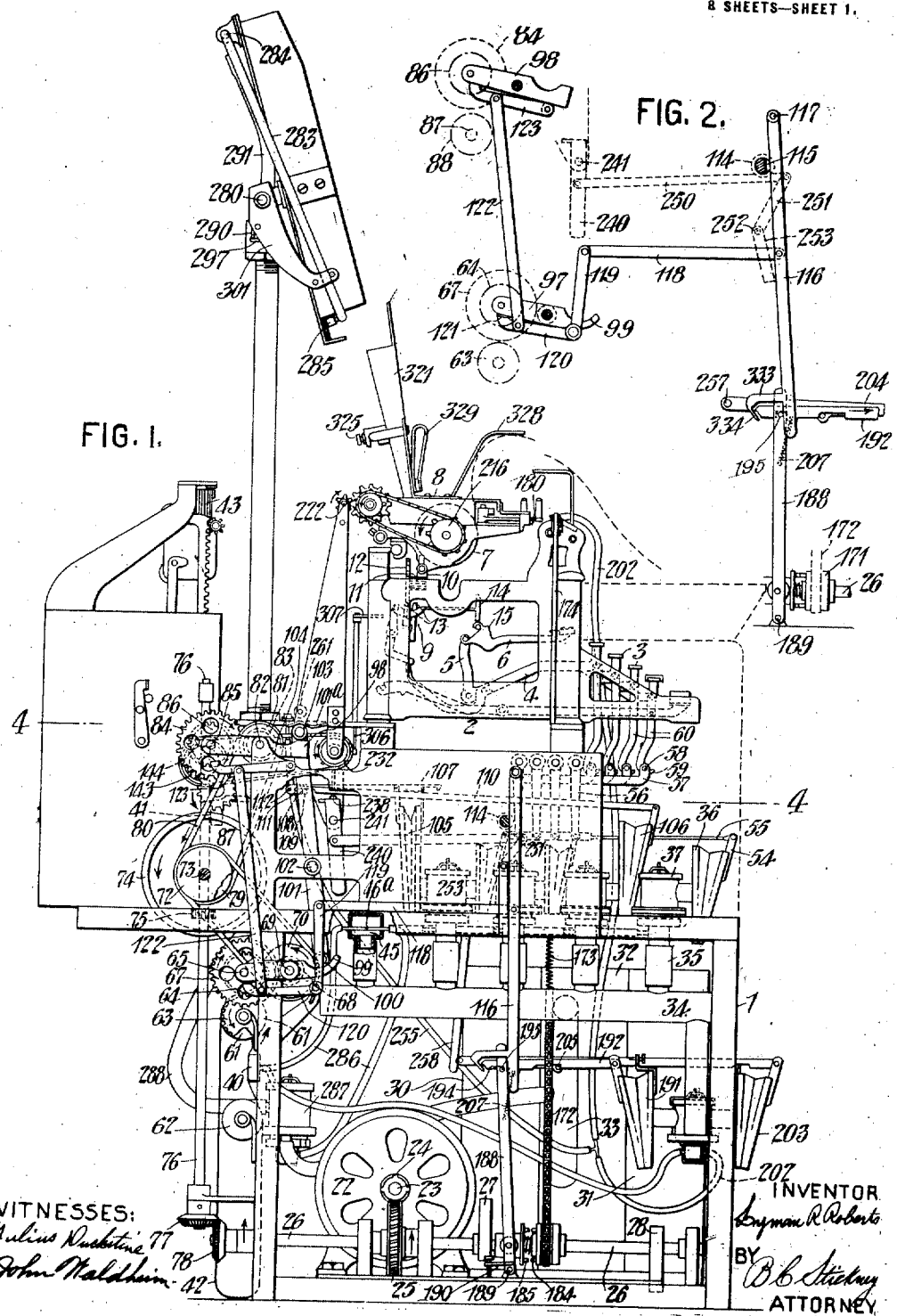

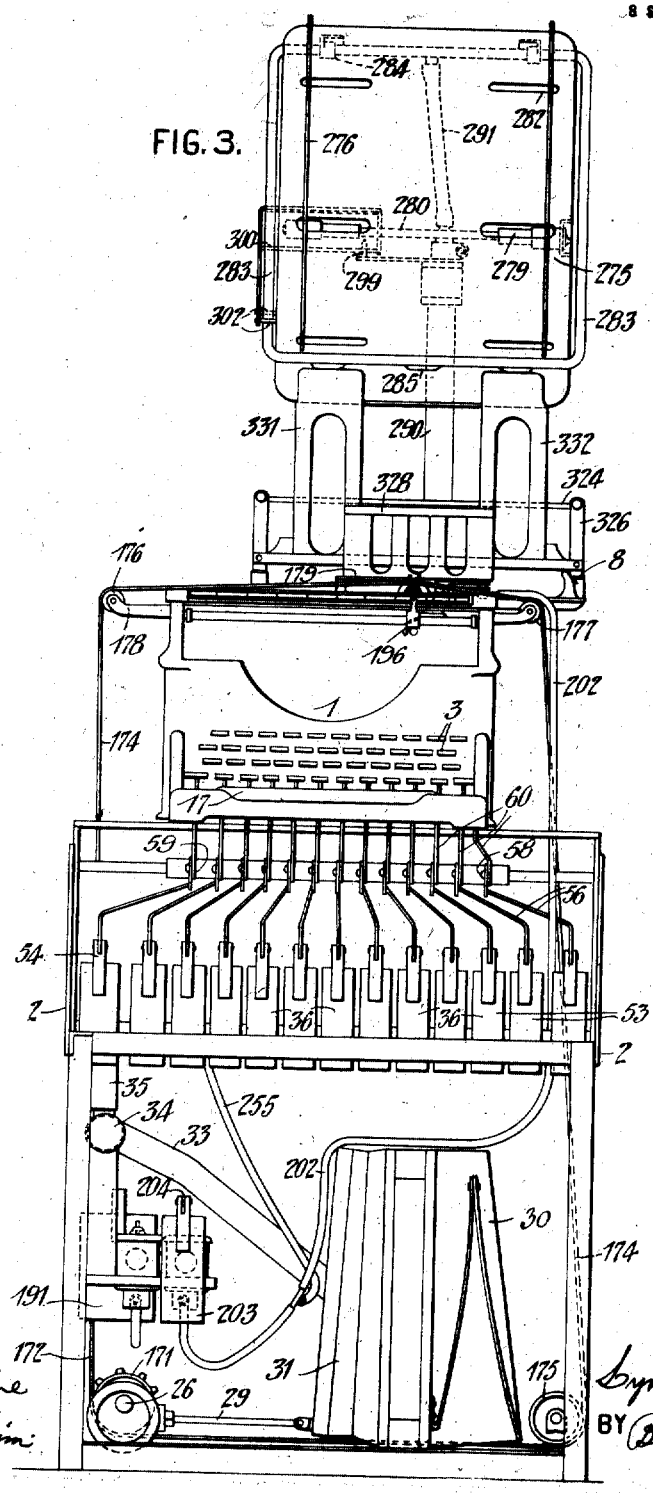

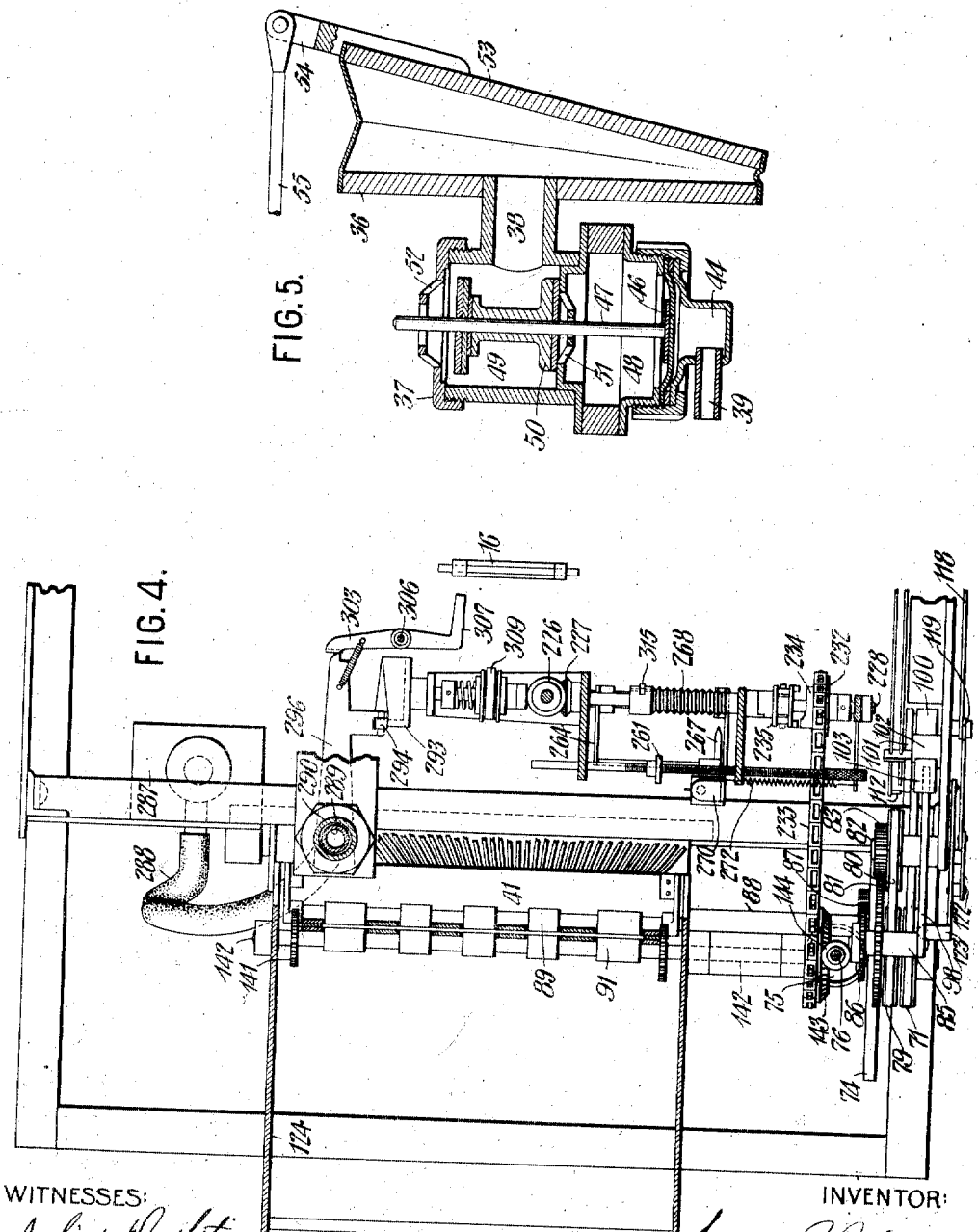

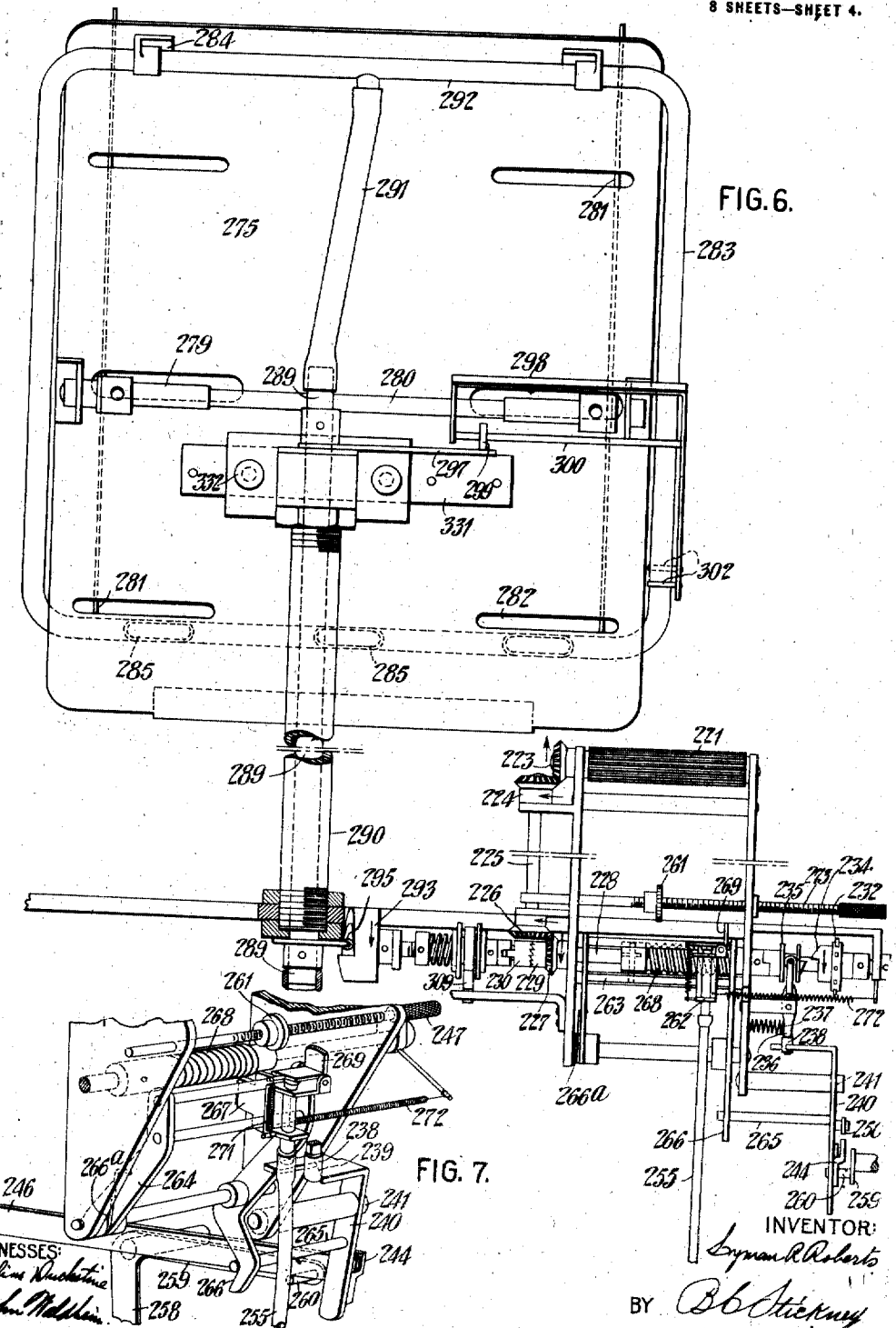

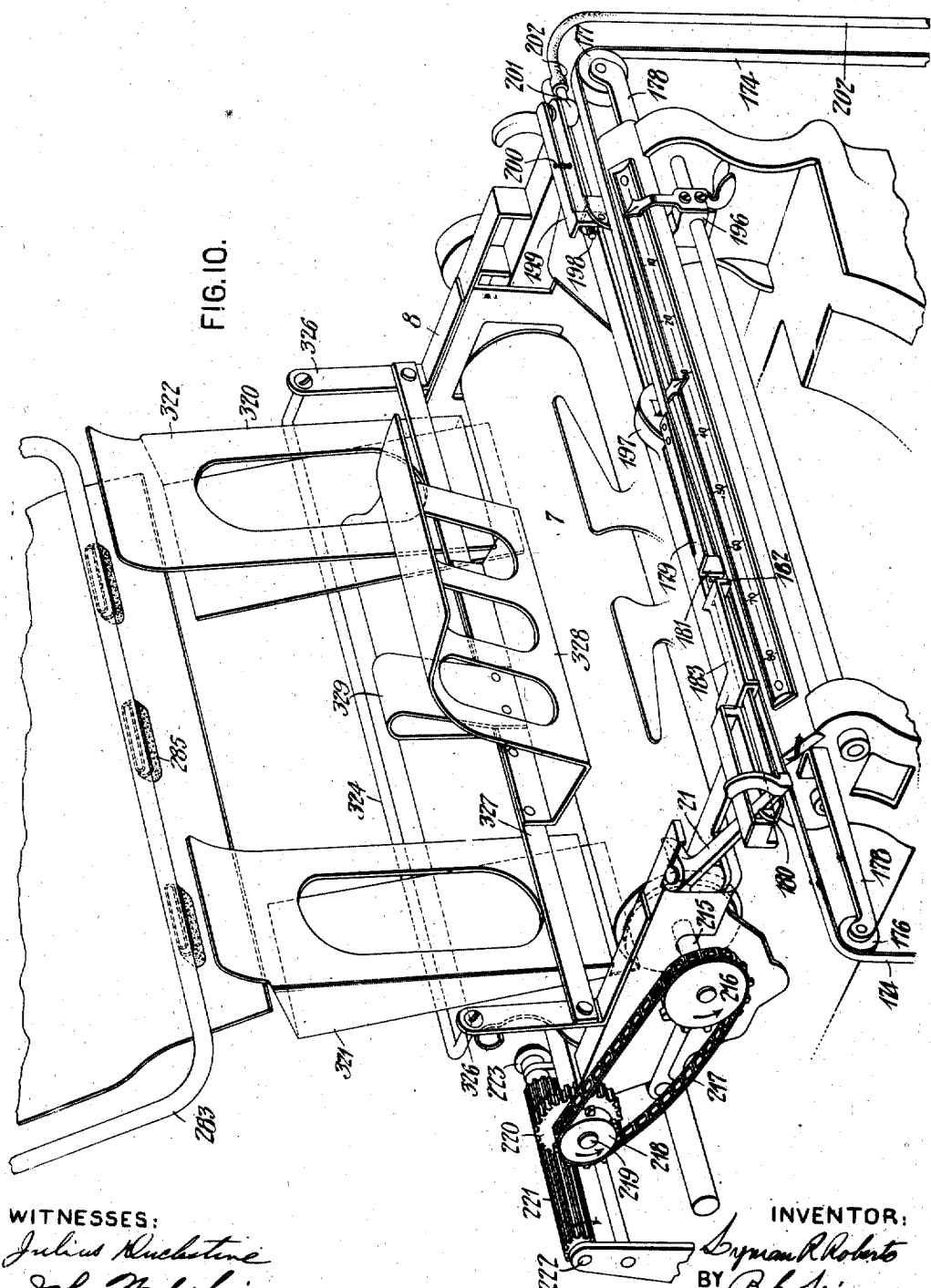

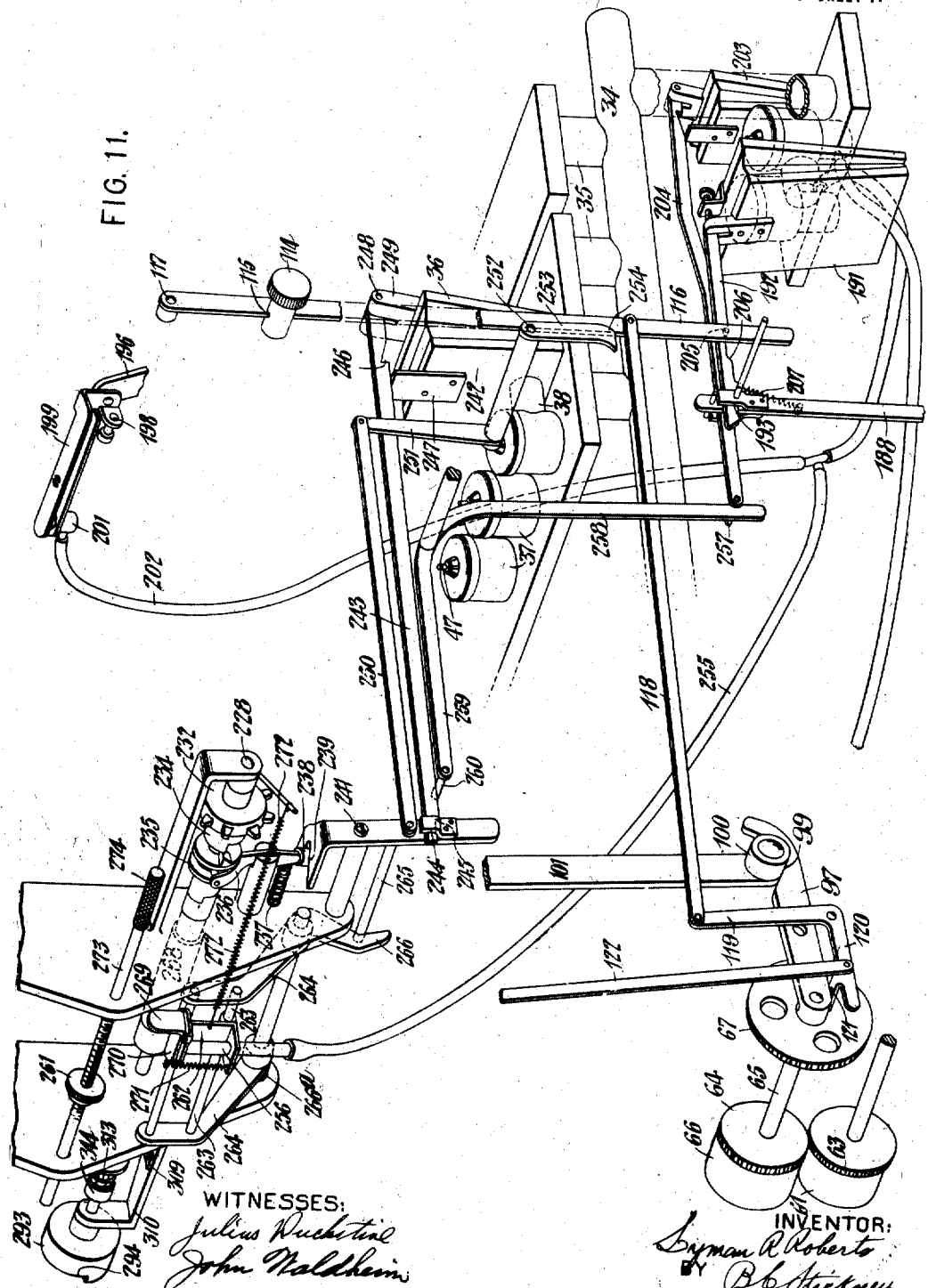

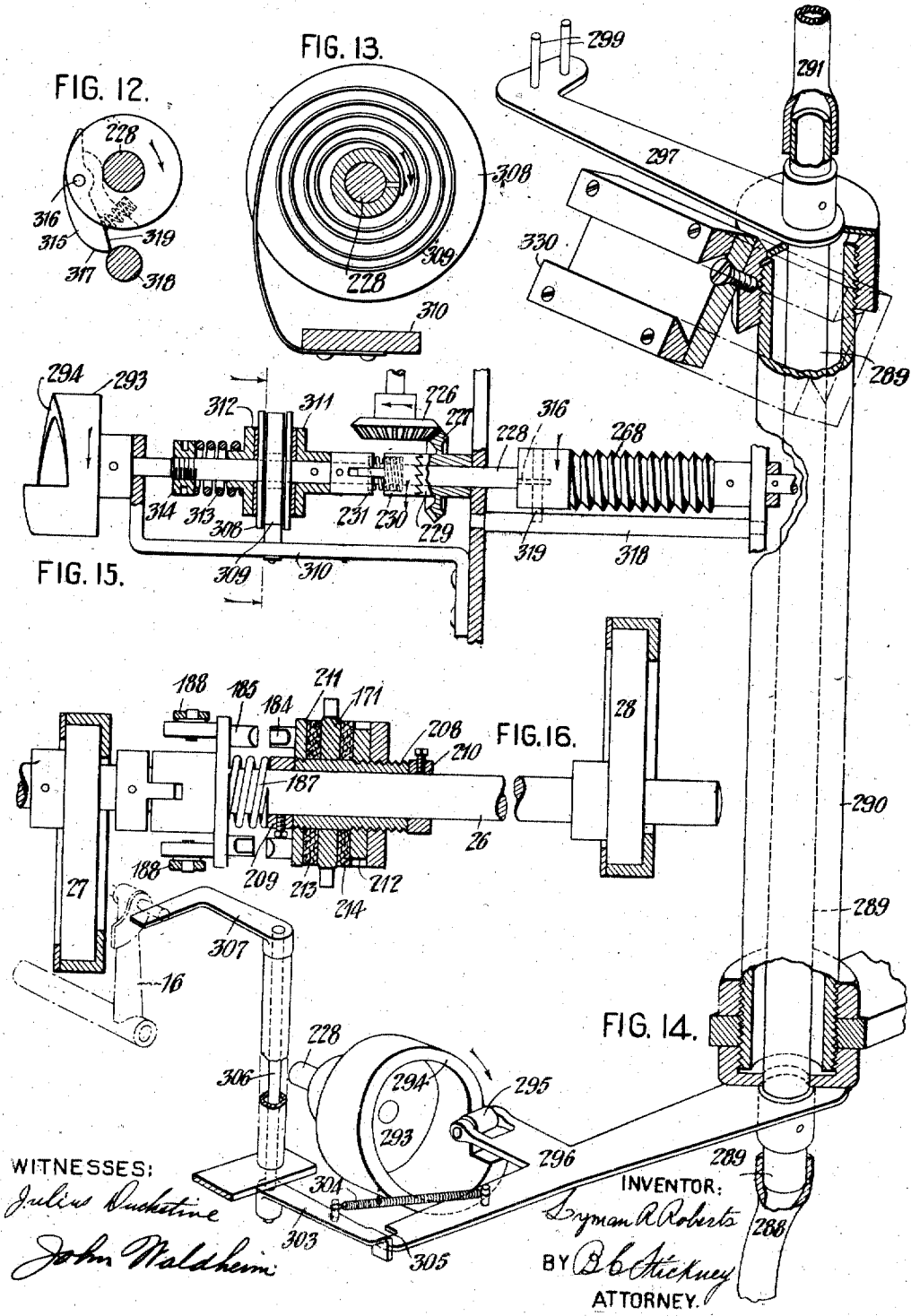

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER OPERATOR.

1,252,846.  Specification of Letters Patent.  Patented Jan. 8, 1918.

Application filed June 8, 1916. Serial No. 102,382.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Operators, of which the following is a specification.

This invention relates to an improvement in typewriter operators and more especially to the class in which all of the functions of the typewriter can be taken care of automatically, whereby not only one but a dozen machines can be looked after by a single operative, it being merely necessary that the blank paper be supplied thereto in stacks and the typewritten matter removed as accumulated.

This application contains matter divided out of my application Serial No. 806,408, filed December 13, 1913, now Patent No. 1,182,314, May 9, 1916.

An object of this invention is to produce a machine which will be simple in construction, compact in its arrangement, and with the operating parts secluded as much as possible and retired from an exposed position.

The machine is of the general type in which the parts are operated by pneumatic actuators, which are controlled by one or more master members passing over tracker boards. In this case two tracker boards are shown, one for writing the body of the matter, such as a letter, and the other for writing inserts, such as a new name and address for each letter. Of course, the inserted matter may also be placed, if desired, even in the midst of the letter, under the control from the second tracker board. The master members are shown of the perforated type, so that when they pass by their tracker boards, they bring perforations successively into register with apertures in the tracker boards in order to admit air to individual controllers, each of which governs the action of a pneumatic actuator. This actuator is connected by mechanical means to the particular part of the typewriter which it is to operate. By this means a successive series of actions of the typewriter may be produced according to any predetermined plan which is governed by the perforations in the master member.

As stated above, in the present case one master member controls the body of the written matter and the other master member controls the inserts. It is therefore essential to shift the control of the operator from one master member to the other. This is controlled by special perforations in each master member, so that they bring into action at proper times, shifting mechanism which enables first one member to be in ascendency and then the other. In the present instance, where one master member controls the body of the writing, it is desirable to make the same of an endless sheet, so that it can repeat over and over again by passing continually over the tracker board with interruptions mainly for the purpose of allowing the other master member to control the operation of the machine. The other master member in this case is, in fact, a series of individual master members shown in the form of a series of cards perforated to correspond to different inserts, which, in the present case, are different names and addresses.

The paper to be written on is supplied to the machine in packs and picked up sheet by sheet at the proper time under the control of one of the master members, by a pneumo-mechanical mechanism, which drops the sheets one by one to the platen on the typewriter as the carriage reaches the end of its return movement. The sheet so dropped is fed beyond the heading thereof, to a point to receive the first line of typewriting, while the previous sheet, which has been completely written on, is fed out and received in a suitable receptacle.

Among the important improvements in the present case, is the means for rotating the platen when a new sheet is fed thereto as mentioned above, to bring the first line for writing to the printing point and to remove the completely written sheet from the platen. This is accomplished by a special drive for the platen from a motor, whose connection to the motor is normally interrupted and made continuous by a clutch when a proper opening in one of the master members comes into register with an aperture in the corresponding tracker board. When closed the clutch is automatically locked in its closed condition so as to continuously drive the platen any predetermined amount. At the same time that the clutch is closed, a valve is connected to be traversed from the driving mechanism of the platen until it comes into engagement with an adjustable stop, whereby it is opened. The opening of the valve excites a pneumatic actuator, which actuator releases the locking means for the clutch, thereby interrupting the drive to the platen, and also disconnects the valve from the traversing means therefor, so that it can be returned by a spring to its normal position. The adjustment of the stop determines the extent of travel of the valve, and hence, the extent of rotation of the platen, which is proportionate thereto, whereby the platen may be rotated any desired number of line spaces.

The same mechanism which rotates the platen at such special points as the changing from a typewritten sheet to a fresh sheet, also operates the paper-feeding mechanism, so that it will lift the sheet to be dropped to the platen. This is accomplished by a sheet-lifter which normally rests on the pack of sheets and has suction cups engaging with the uppermost sheet. At the proper instant, one of the master members brings an opening therein into register with an aperture in its tracker board, so that this lifter is connected up with the source of suction; then when the clutch mentioned above is connected, a cam will be rotated to shift this sheet-lifter to a raised position, holding up the uppermost sheet, and the sheet-lifter will be locked in this position. Now when the carriage reaches the end of its return movement, air will be admitted to the sheet-lifter, permitting the sheet raised to drop to the platen, where it will be fed around by the platen-rotating mechanism. The lock for the lifter will remain in action until some one of the keys of the typewriter is actuated, as it is releasable automatically solely by the universal bar of the typewriting mechanism, which trips it when the master member starts to bring the typewriting mechanism once more into action. That is to say, the first time the universal bar is actuated, it will trip this locking mechanism for the sheet-lifter and permit it to return to a position with its pneumatic suction cups in engagement with the next fresh sheet on the stack.

The return of the carriage is obtained by connecting up a special retrieving mechanism therefor in driven relation with a motor, by means of a normally open clutch. This mechanism is so operated that it locks the clutch in its closed position, the unlocking of which takes place when the carriage is returned its full limit as determined by a margin gage, by a valve located on the margin gage and tripped by the carriage, so as to bring into play a pneumatic actuator which releases the locking means.

Other features and advantages will hereinafter appear.

In the accompanying drawings,

Figure 1 is a general view in side elevation of the machine as a whole, with parts omitted for the sake of simplicity, and showing, in dotted lines, the path of travel of a completely typewritten sheet in leaving the platen.

Fig. 2 is a skeleton view in side elevation, showing the means for silencing the feed for both tracker boards when the carriage is being returned.

Fig. 3 is a view of the machine as a whole in front elevation, with many parts omitted for the sake of simplicity.

Fig. 4 is a horizontal section on the line 4—4 of Fig. 1, showing the general relation of the pneumatic actuators to one of the tracker boards, and also showing details of the platen-rotating mechanism and the sheet-feeding mechanism.

Fig. 5 is a detail section through one of the pneumatic actuators and the control therefor.

Fig. 6 is a rear view in elevation of the sheet-feeding mechanism, and also of the platen-rotating mechanism which is used when the sheet is first fed to the platen to bring the initial line of printing to the printing point, that is, the feeding mechanism which rotates the platen in passing the heading on the sheet to be typewritten and in removing a written sheet from the platen.

Fig. 7 is a detail perspective view of the mechanism for controlling the extent of feed or rotation of the platen.

Fig. 8 is a view in side elevation, showing the sheet-feeding mechanism. In this view, the sheet-lifter is shown in full lines in engagement with the pile of sheets, and in dotted lines in its position lifting a sheet from the pile ready to drop it to the platen.

Fig. 9 is a perspective view of the parts shown in Fig. 8, with the sheet-lifter in its raised position away from the pile of sheets.

Fig. 10 is an enlarged perspective view, showing the mechanism for receiving the sheet from the sheet-feeding mechanism and directing it to the platen, the sheet-lifter being shown in this case with the sheet withdrawn from the pile ready to drop it into the receiving mechanism.

Fig. 11 is a skeleton perspective view, showing the mechanism for controlling the termination of the return movement of the carriage and also the termination of the extent of drive of the platen in bringing a new sheet to the writing point.

Figs. 12, 13 and 14 are details of the mechanisms for operating the sheet-lifter when the carriage is returned, so that when the carriage reaches the extreme of its return movement, the sheet-lifter will be operated to lift the sheet and drop it on the platen when the platen is properly positioned to receive it.

Fig. 15 is a detail view of the platen-rotating and sheet-feeding drive.

Fig. 16 is a detail section along the main drive shaft, showing the clutch for connecting up the traversing mechanism of the typewriter carriage.

An operator 1 actuates all of the parts of a typewriter 2 essential to a complete typewriting action.

Considering briefly the parts of the typewriter, which is shown in the present instance to be an Underwood although any other machine might be used, character keys 3 (Fig. 1) operate levers 4 to rock bell cranks 5, so as to swing type-bars 6 up rearwardly against the front side of a platen 7 mounted to rotate on a carriage 8, which travels on ways on the frame of the typewriter, under the control of an escapement mechanism indicated in general at 9. This escapement mechanism includes a rack bar 10, pivotally mounted on the frame of the carriage 8, so as to swing into and out of engagement with a pinion 11 connected to rotate with an escapement wheel 12, which is controlled by a pair of dogs 13 actuated by a universal frame 14, which is operated at the actuation of any of the keys, by heels 15 provided on all of the type-bars. The universal frame 14 is mounted for movement on a swinging frame 16. Particular attention is called to this point, inasmuch as this part is used to release the locking mechanism which holds the sheet-lifter in its elevated position when any key is struck after having fed a new sheet of paper to the typewriter. The frame 16 may be operated also by a space key, 17 which forms also a part of the typewriting mechanism, and depresses a lever 18 to thrust up an arm 19 provided on the shift frame 16. The platen 7 has the usual line-space wheel, which is engaged by the usual line-space mechanism including the line-space lever 21, which may be operated by hand or automatically in the manner to be described.

Having thus briefly described the more essential parts of the typewriter, a more elaborate and detailed description of the operator therefor may be taken up. The automatic operator for the typewriter has its motive source in an electric motor 22 (Fig. 1), which is provided with a shaft 23 having a worm 24 thereon meshing with a worm wheel 25 to drive the same, so as to drive a shaft 26 on which the worm wheel 25 is secured. The shaft 26 is provided with a pair of eccentrics 27 and 28 arranged in opposite phases on the shaft 26, so as to drive, by means of straps and eccentric rods 29, the two sections 30 and 31 (Fig. 3) of a bellows vacuum pump. One section will be filling while the other is exhausting, so that a common vacuum chamber 32 therefor will be always under a section so long as the motor 22 is driving. The suction or vacuum chamber 32 has connected thereto, a main pipe 33, which, by virtue of a feeder 34 and various laterals 35, is arranged to connect with the source of suction, the several pneumatic actuators for the different parts of the hereinafter mentioned vacuum chambers 48 of the mechanism.

Considering specifically the operation of one of these pneumatic actuators, which will serve for all as they act substantially alike, it will be seen by reference to Fig. 5, that each actuator consists of a motor 36 in the form of a collapsible bellows, and a controller 37, which is connected to the motor by a pipe 38. Each controller 37 is connected by tubing 39 to either one or both of a pair of trackers or tracker boards 40 (Fig. 1), according to whether the particular actuator to which the controller corresponds is to be controlled in its action by one or both of the trackers and their master members. That is to say, one of the trackers, take for example, the tracker 40, is used to control the writing of the main portion or body of the matter to be typewritten, and the other, such as the tracker 41, is used to control the writing of the inserts,—such as the different names and addresses placed at the top of the several letters.

In the case of the tracker board 40, the master member which controls the same, is in the form of an endless perforated sheet 42 (Fig. 1), which may be passed repeatedly in front of the tracker 40, as the matter which it controls, such as the body of the letter, is to be repeated over and over again in each new sheet of typewriting. In the case of the upper tracker 41, which controls the writing of the inserts, the master member may, in fact, be several different master members shown in the form of individual perforated cards 43, which are successively brought into coöperation with the tracker 41 to successively control the action thereof.

It is to be understood at this point that the control of the action of the operator 1 is alternately given over entirely first to one tracker board and then to the other. That is to say, the upper tracker 41 will first control the writing of the address, then the control will be shifted to the lower tracker, when the body of the letter will be written; after which, when a new sheet is placed on the typewriter, the control will again be shifted back to the upper tracker to write a new name and address for the new sheet, and so on.

Going back at this point to the particular structure of each actuator and its controller, when one of the master members brings an opening therein into register with an aperture in its tracker board, the particular controller connected thereto by the tubing 39 will have air admitted in a chamber 44. This chamber is normally under a negative or sub-atmospheric pressure, as it is connected with the source of vacuum. This connection is obtained by having each of the tubes or tubings 39 extend through a common suction or bleed chamber 45 (Fig. 1), connected by a lateral with the feeder 34, the portion of each tube within said bleed chamber 45 being provided with a bleed opening 46 of sufficient size to gradually exhaust the air from the corresponding chamber 44 in the accordant controller 37, but not fast enough to absorb the air admitted through the alined apertures in the master sheet and the tracker in operation. It is thus evident that when air is admitted to the chamber 44 of any particular controller, it will fill the chamber 44 of the controller, raising a diaphragm 46 which forms the top of the chamber, and carrying with this diaphragm, a valve rod 47, which extends upwardly through an intermediate vacuum chamber 48 into an equalizing chamber 49. The chamber 48 is connected, as mentioned above, to the suction pump by the main pipe 33 and the feeder 34 and the laterals 35. This chamber 48 may be common, if desired, to a bank of controllers 37 or individual to each controller.

When the pressure of air admitted to the chamber 44 raises the diaphragm 46 and the valve rod 47 against the weight of the parts and the negative pressure in the vacuum chamber 48, it also raises a valve 50 secured to the valve rod 47. This valve 50 in duplex and first opens a passage 51, forming a means of communication between the vacuum chamber 48 and the equalizing chamber 49, and then closes a passage 52 between the equalizing chamber 49 and the outside atmosphere. That is to say, the valve 50 is double-ended and operates to alternately close and open the passages 51 and 52. When the valve 50 is raised, it connects the equalizing chamber 49 with the vacuum chamber 48, so that air is withdrawn from the equalizing chamber, and this will continue until the valve 50 closes the passage 52, when the air will not only be sucked out of the equalizing chamber 49, but, through the connecting pipe 38, will also be sucked out of the pneumatic bellows motor 36 forming the active part of the actuator. When the air is thus withdrawn from the interior of an actuator, the outside atmospheric pressure causes the same to collapse so that any part connected to the moving side 53 thereof will be operated.

When the opening in the master sheet passes out of register with the aperture in the tracker board which causes this action, the air will be cut off from the chamber 44, so that the air remaining therein will be sucked out through the bleed opening 46ᵃ until the pressure on both sides of the diaphragm 46 is balanced, causing the weight of the parts to drop the valve 50 to a position closing the passage 51 and opening the passage 52. The bellows motor 36 being cut off from the suction and opened up to atmospheric pressure, will expand and return to its normal condition with the aid of a spreading spring not shown.

In the case of the actuators which operate the various keys of the typewriter, each one is provided with an arm 54 (Figs. 1 and 3), which is connected by a link 55 to one arm of a bell crank 56. The other arm 57 of each bell crank 56 is provided with a pin 58, which overlies a hook 59 on a link 60 pivoted to the corresponding key of the typewriting mechanism. That is to say, each key is provided with a link 60 having hook 59 underlying one of the pins 58 on one of the bell cranks 56. The arms 57 of the bell cranks are of various lengths and arranged in echelon, so as to avoid one another and coöperate with their corresponding links 60.

It will be seen that any of the keys of the typewriting mechanism, whether the character keys 3, the space key 17, the shift keys, tabulating key, or any other key, may be operated by the corresponding one of the actuators 36.

It will further be seen that the connections are such that the keys may be operated manually without disturbing the actuating mechanism. That is to say, any of the keys may be depressed when their hooks 59 will merely move downwardly away from the pins 58, without disturbing the bell cranks 56. This permits the typewriting mechanism to be operated by hand as well as by the pneumatic operator.

Having considered how the pneumatic actuator is constructed and acts, we may now go on to the description of the feeding mechanism for the master members, which control the action of all the actuators, and how the shift is made from control by one to control by the other at the proper times.

The master sheet 42, which controls the writing of the main part or body of the typewritten matter, such as the body of the letter, passes over a supporting feeding roller 61 (Fig. 11) and is warped across the face of the tracker 40 by means of an idle roller 62 (Fig. 1). The supporting roller 61 is provided with a gear 63, which may be driven at times by a gear 64 secured on a shaft 65, on which is also secured a roller 66. When the master sheet 42 and its tracker 40 are in control, the feeding roller 66 is dropped down to bind the master sheet 42 between its surface and the surface of the supporting roller 61. Under these conditions, the gear 64 will also mesh with the gear 63, so as to drive the same; hence the master sheet will be fed in the direction of the arrows shown in Fig. 1, past the tracker 40, bringing the several perforations therein successively into register with corresponding apertures in the tracker 40.

To drive the shaft 65, and thus the rollers 61 and 66, there is provided on the shaft 65, a gear 67 (Fig. 11), which meshes with a pinion 68 (Fig. 1) secured to a shaft 69 carrying a pulley 70, which is driven by an endless belt 71 from a pulley 72. The pulley 72 is secured to a shaft 73 on which is also secured a friction disk 74 driven by a friction roller 75 bearing against one surface on the disk 74. The friction roller 75 is secured to a shaft 76 driven by a pair of meshing bevel gears 77 and 78, from the cross shaft 26, which, as mentioned above, is driven from the motor 22.

The feeding mechanism for the upper master member is also driven from the shaft 73. For this purpose, there is provided on this shaft, a second pulley 79 (Figs. 1 and 4), which is connected, by means of an endless belt 80, to drive a pulley 81 on a shaft 82. The shaft 82 also has secured thereon a pinion 83 meshing with the gear 84 secured on a shaft 85. Also secured on the shaft 85, there is provided a pinion 86, which when lowered is arranged to drive a pinion 87 secured on a shaft 88. This shaft 88 has secured thereon a sectional feeding roller 89, the sections of which extend through openings in a guide 90 to engage the upper master card 43 which happens to be in action (Fig. 4). A similarly sectioned feeding roller 91 passes through openings in the guide 90 and coöperates with the opposite side of the master card 43 in action, so that when the shaft 88 is being driven, the card will be fed down by the coöperation of both the feeding rollers 89 and 91, they being connected to rotate in unison by pinions not shown in the drawings, secured, respectively, to the feeding roller 89 and the feeding roller 91. A bearing roller corrugated so as to avoid obstructing the openings in the master card 43, holds the master card against the tracker 41, in order to obtain an airtight fit therebetween. As noted above, however, both master members, that is, the master card and the master sheet, are not in control at the same time. To regulate this change in control, the drive is completed to the feeding mechanism for one master member and interrupted to the feeding mechanism for the other master member, and vice versa. To accomplish this, the shaft 65 for the master sheet 42 is floatingly mounted by a frame including arms 97 (Figs. 1 and 11) pivotally supported on the shaft 69, so as to swing relatively thereto without disturbing the driving connection to the shaft 69. Likewise, the shaft 85 for the master card 43 is floatingly mounted by means of a frame including one or more arms 98 pivoted on the shaft 82, so as to swing relatively thereto without interrupting the connection between the gears 83 and 84. One of the arms 97 is provided with a camming socket 99, in which may rest a camming roller 100 secured to the lower end of a shifting lever 101. This shifting lever is pivoted, intermediate its ends, as at 102 (Fig. 1), and is provided at its upper end with a bearing roller 103 coöperating with a cam socket 104 in one of the upper arms 98.

It will be seen that when the lever 101 is in the position shown in Figs. 1 and 11, the roller-bearing end of the arm 97 will be lowered, so as to permit the roller 66 to drive the master sheet 42 and also permit it to drive the supporting roller 61 through engagement of the gear 64 with the gear 63. This same position of the lever 101, however, as shown in Fig. 1, causes the bearing roller 103 to rest on the dwell portion above the cam socket 104 and thereby hold the gear 86 out of mesh with the gear 87, so that the drive to the feeding rollers 89, 91, is interrupted. On the other hand, when the lever 101 is shifted, the master card 43 will be in control as the gear 86 is dropped into mesh with the gear 87, completing the drive to the feeding rollers 89, 91, while the shaft 65 and the roller 66 are raised, interrupting the drive between the gear 64 and the gear 63.

In order to manipulate the shifting lever 101, a pair of pneumatic actuators 105 and 106 are provided which are adapted to shift the lever 101 in opposite directions. The actuator 105, which controls the bringing into play of the feeding mechanism for the master sheet 42, is controlled by a perforation in the particular master card 43 in action; while the actuator 106, which controls the bringing into play of the feeding mechanism for the master card 43 is controlled by a perforation in the master sheet 42. In other words, one master member controls the bringing into play of the other master member. As the actuators 105 and 106 are of the type described above and shown in Fig. 5, it is not necessary to re-describe them at this point. Sufficient to say that when the actuator 105 is brought into control by an aperture in the master card 43, it will assume the Fig. 1 condition, whereby a link 107 will, by virtue of a hook or shoulder 108 thereon, draw the lever 101 to the Fig. 1 position, by engagement with a rod or lug 109 on the lever 101, the latter being yieldingly held in this position by a spring detent 101ª, Fig. 1.

Now when the master sheet 42 has finished its period of control, having completely written the body of a letter, after a new work-sheet has been supplied to the typewriter, then a perforation in the said master sheet 42 comes into register with a corresponding aperture in its tracker 40, so as to cause the pneumatic actuator 106 to collapse its bellows motor. This will bring about a condition in the actuator 106, whereby a thrust link 110 will be plunged forwardly, first causing a cam nose 111 thereon to engage a pin 112 on the link 107, disengaging the shoulder 108 from the lug 109, so as to free the lever 101 from the actuator 105 and its link 107. A further movement of the thrust link 110 causes a shoulder 113 thereon to engage the lug 109 and force the lever 101 from the Fig. 1 position to a position where the cam roller 103 will drop into the socket 104, permitting the arm 98 to lower the gear 86 into mesh with the gear 87, thereby completing the drive to the feeding rollers 89, 91, so as to feed the master card 43 into position past its tracker 41. At the same time, the lower roller 100 and the lever 101 rock, by a camming action, the arm 97, so as to withdraw the gear 64 from its meshing position with the gear 63, thereby interrupting the drive to the master sheet 42. When the master card thus started into control has been fed to the end of its capacity for control, and has finished writing of a name and address, a perforation therein comes into register with a corresponding aperture in its tracker 41, causing the actuator 105 to come into action. When this takes place, the actuator pulls the link 107 to a position where the pin 112 engages the end of the nose 111, camming the latter upward, so as to disengage the shoulder 113 from the lug 109. A further movement of the link 107 under the pull of the actuator 105, causes the shoulder 108 on this link to engage the lug 109 and shift the lever 101.

It is advisable at times to throw out the feeding mechanisms for both the master card and the master sheet, as when it is necessary to stop the machine or when the carriage is being traversed, or the platen rotated. In the last two cases, it would be inadvisable to have keys struck when the work-sheet is in motion. To accomplish this manually, as in stopping the operation of the machine, there is provided a throw-out button 114 (Figs. 1, 2 and 11), which, when the machine is in action, has a groove 115 in register with a shifting bar 116, pivoted at 117. When, however, it is desired to disconnect the drives for both the feeding mechanisms, the manual button is rotated from the Fig. 1 position to shift the bar 116 about its pivot 117 to draw on a link 118, so as to rock a bell crank 119. This bell crank is provided with an arm 120, having an offset 121 (Fig. 11), which underlies the arm 97 supporting the shaft 65 and the roller 66. The arm 120 of the bell crank 119 is also connected by a link 122 to an arm 123 also having an offset underlying the shifting frame or arm 98, which shifts the gear 86 of the driving mechanism for the master card-feeding mechanism.

It will thus be seen that both the arms 97 and 98 will be swung with their gearing-bearing end raised, so as to simultaneously interrupt the drive to both the feeding mechanisms. That is to say, when the button 114 is rotated, it simultaneously interrupts the drive for both master members, so that the machine is silenced. This action is also effected, as will be explained presently, when the carriage is returning to begin a new line and when the platen is being rotated to either position the new work-sheet on the platen or to discharge a completed letter from the platen.

After one master card has completed its work and shifted its control to the master sheet, then it must be removed from an effective position and a fresh card put in its place, so that a new name and address can be written on the next work-sheet fed to the platen. This is accomplished in a manner described in my herein mentioned patent.

While writing any matter with the typewriter, it is essential to return the typewriter carriage and to line-space the platen at the end of each line so as to enable the beginning of a new line. To enable the automatic operator to perform this function, there is provided on the shaft 26, which as stated above, is driven from the motor 22, a sprocket 171 (Figs. 1 and 16). This sprocket is not fixed on the shaft 26, but is connectible thereto, so as to be driven thereby, and thus drive an open stretch of sprocket chain 172, which is flexibly connected, as by one or more springs 173, to a draw-band 174. This draw-band forms with the chain, a complete endless traversing member, which passes over one or more guiding rollers 175 on the operator frame and also over guiding rollers 176, 177 on the typewriting machine frame. These last rollers may be offset considerably from the typewriter frame, by brackets 178, to give the necessary reach in traversing the typewriter carriage 8.

The draw-band 174 has secured thereto a connector 179, which is provided with a hook 180 to engage the line-space lever 21, so as to space the platen as well as return the carriage when the draw-band is traversed in a clockwise direction, as in Fig. 10. The backward movement of the draw-band 174 relatively to the carriage 8, is limited by a shoulder 181 formed by a bend in the connector 179, which shoulder engages a shoulder 182 provided on a guide 183, through which guide the band 174 extends and which is secured on the typewriter carriage 8. The normal spring (not shown) of the line-space mechanism of course acts when the traction on the draw-band 174 is released, to return the connector 179 and the parts joined thereto to the positions shown in Fig. 10.

In order to connect the sprocket wheel 171 in driven relation with the shaft 26, there is provided a clutch element 184 (Figs. 1 and 16), which is secured to the sprocket 171 in any suitable manner, such as that shown in Fig. 16. A second clutch element 185 is splined on the shaft 26 and shiftable against the tension of a spring 187, which normally holds it out of engagement with the clutch element 184, into engagement therewith, so as to complete the driving connection between the sprocket 171 and the shaft 26.

To move the clutch element 185 against the tension of the spring 187, there is provided a clutch shifter 188, pivoted at 189, and limited in its movement, owing to the impulse of the spring 187, by an adjustable stop 190 (Fig. 1). The clutch shifter 188 is operable by a pneumatic actuator 191 under the control of either the master card or the master sheet according to which is in action. That is to say, when the end of a line of typewriting is reached, a carriage-return perforation in the master member in control, will come into opposition with an aperture in the corresponding tracker, exciting the pneumatic actuator 191 to operation in the usual way, so that the bellows motor thereof will collapse, drawing on a link 192 (Figs. 1 and 11), which extends through a guide 193 in the shifter 188, and is provided with a notch 194 having teeth on either side thereof, so that the link 192 can settle over a pin 195 provided on the shifter 188. Thus, when the bellows motor of the actuator collapses, it draws on the link 192 to rock the shifter 188 to the right (Fig. 1), so as to close the clutch comprising the elements 184 and 185 and thus connects the sprocket 171 in driven relation with the shaft 26, thereby enabling the return of the carriage and the line-spacing of the platen by means of the draw-band 174.

It will be noted in passing that the movement of this shifter 188, to cause a return movement of the carriage, also disconnects the drive of both the feeding mechanisms of the master control sets, so that whichever one is in action will be silenced until the carriage is completely returned, thus preventing any typewriting action of the keys while the work-sheet is moving. This is accomplished by the pin 195 (Fig. 2), which is extended to engage the bar 116 (Figs. 2 and 11), whereby the link 118 will be drawn on to lift both sets of the gear-bearing frames or arms 97 and 98. Of course this stopping of the master sheet in action leaves the perforation which caused the collapsing of the bellows motor of the actuator 191, in register with the aperture in the tracker, thereby maintaining this actuator in action until the carriage has been completely returned. That is to say, the drive from the shaft 26 and thus from the motor, is maintained until the carriage reaches the limit of its return movement. The limit of this return movement is determined by a margin gage 196, which is adjustably mounted on the typewriter frame.

As the carriage 8 of the typewriter approaches the end of its return movement, a trip 197 comes into engagement with an adjustable stop 198, which is secured to a valve 199 pivotally mounted on the margin gage 196. This valve is normally held in its closed position by a spring 200, so as to prevent air leaking into a controlling tap 201. When, however, the carriage reaches the limit of its movement, it rocks the valve 199, admitting air to the tap 201 and thus to tubing 202 connected thereto. This tubing is connected to the control of a pneumatic actuator 203, so that the latter will come into action at this time. When the pneumatic motor of this pneumatic actuator 203 is collapsed, it forces a plunger 204 (Figs. 1 and 11) forwardly, so that the latter, through the intermediary of a pin 205 carried thereby, engages a cam surface 206 on the link 192 and raises the same against the tension of a spring 207, so as to withdraw the notch 194 of the link 192 from engagement with the pin 195. When the link 192 is thus disconnected from the shifter 188, the spring 187 is free to act, forcing the clutch element 185 away from the clutch element 184, and disconnecting the sprocket 171 from driven relation with the shaft 26. The return of the shifting lever 188 also permits the return of the bar 116, and thus allows the particular feeding mechanism which was in action before the carriage started to return, to come into action once more, so as to drive its master member to advance the carriage-return perforation and bring the next perforation into register with its proper aperture in the accordant tracker board.

In Fig. 16, it will be seen that the sprocket 171 is mounted loosely on a sleeve 208, mounted loosely on the shaft 26 between collars 209 and 210. The sprocket 171 is merely frictionally connected to a disk 211 bearing the clutch element 184, so that it may have a certain amount of slippage relatively to the clutch, to take up any jar in suddenly connecting the clutch in driven relation with the shaft 26, and also to prevent the breakage of any of the parts in case the carriage reaches the limit of its return stroke before the clutch element 185 is disconnected from the clutch element 184. To obtain this lost motion and yet positive connection, the sprocket 171 is clamped between the disk 211 and a disk 212, with a pair of friction washers 213 and 214, one on either side of the sprocket 171, the sleeve 208 being screw-threaded at its ends to coöperate with corresponding screw-threads on the disk 211 and the disk 212.

After a work-sheet has been completely written, as with the full name and address and body of the letter, this sheet must be removed from the platen and a fresh one put on in place thereof. To eject the finished sheet from the platen, the platen could be rotated by repeated operations of the line-space lever by the carriage-return mechanism. However, special means for rotating the platen is also provided which can accomplish the same purpose somewhat more quickly. For this purpose, the platen axle 215 extends beyond the frame of the carriage where it is provided with a sprocket 216 (Fig. 10) driven by a sprocket chain 217, which in turn is driven by a sprocket 218 on a shaft 219. The shaft 219 is provided with a gear 220 meshing with a barrel pinion 221 on a shaft 222, which is mounted to rotate on a fixed portion of the frame. The shaft 219 is mounted on the carriage so that it travels therewith and causes its gear 220 to mesh with the barrel pinion 221 when the carriage is at the end of its return movement. The barrel pinion is of considerable length so as to allow for the drive of the platen therefrom at a variety of positions of the carriage 8.

To drive the barrel pinion 221, the shaft 222 is provided with a bevel gear 223 (Fig. 6), which is driven by a bevel gear 224 on a shaft 225. This shaft 225 also has a bevel gear 226 driven by a bevel gear 227 loosely mounted on a shaft 228. The bevel gear 227, however, is normally connected in driven relation with the shaft 228 by a one-way clutch element 229 thereon meshing with a corresponding clutch element 230 splined on the shaft 228 (Fig. 15). A spring 231 normally holds the clutch element 230 in mesh with the clutch element 229, so that rotation of the shaft 228 in the direction of the arrow shown in Fig. 15, will be transmitted to the clutch element 229 and thus to the bevel gear 227. If, however, the shaft 228 rotates in a counter-direction, the clutch element 230 will slip idly past the clutch element 229, without disturbing the gear 227 and the train of gearing to the platen. The shaft 228 is normally silent but has a sprocket wheel 232 loosely mounted thereon, by means of which it may be driven. This sprocket wheel is driven by a chain-and-sprocket connection 233 (Figs. 1 and 4), from the constantly-rotating shaft 142 which, as explained above, is driven from the motor 22.

To drive the shaft 228 from the sprocket wheel 232, there is provided on the sprocket wheel 232, a clutch element 234, into engagement with which may be shifted a clutch element 235 splined on the shaft 228 (Figs. 6 and 11). The clutch element 235 is provided with an annular groove, into which extend pins on a clutch-shifter 236, which latter is normally held by a spring 237, in a position corresponding to the disengagement of the clutch element 235 with respect to the clutch element 234. The shifter 236, however, is provided with a follower roller 238, engaged by a cam 239 on a lever 240 pivoted at 241.

When it is necessary to rotate the platen, as in removing a completed sheet therefrom, a perforation in the master sheet comes into register with an aperture in the tracker and excites to action a pneumatic actuator 242, so that the bellows motor thereof collapses to thrust forwardly a plunger 243. This plunger engages in a crotch 244 provided on the lever 240 and has a shoulder 245 to engage a part, forming with the lever 240 the crotch, so as to shift the lever 240 and cause the cam 239 to manipulate the shifter 236 against the tension of the spring 237 in order to bring about an engagement of the clutch element 235 with the clutch element 234, thereby connecting the shaft 228 in driven relation with the sprocket wheel 232 which is constantly rotating.

While the platen is rotating, it is essential to stop the movement of the master member in control, so the bar 116 is actuated to interrupt the drive to both master-member feeding mechanisms in the manner described above. For this purpose, the shifter 240, when actuated, also pulls on a link 250 to swing an arm 251 secured to a rock shaft 252, which is also provided with an arm 253 having an extension 254 engaging this bar 116, to rock the same to its disconnecting position shown in Fig. 2.

To insure the silencing of said master member until said completed sheet has been removed from the platen, the plunger 243 is provided with a notch 246 which catches over a latch 247 on one face of the actuator 242, so that the bellows motor of the actuator is held in its collapsed position until the plunger 243 is raised out of engagement with the latch 247. This latter movement is permissible, inasmuch as the plunger 243 is pivotally mounted at 248 on a lug 249 carried by the moving side of the bellows motor of the actuator 242. By this arrangement, the clutch element 235 is held in engagement with the clutch element 234, so long as the plunger 243 is in locking engagement with the latch 247. Under these conditions, the platen will be rotated through the train of gearing continuously, until the plunger 243 is raised, permitting the unclutching of the continuously-rotating sprocket 232 from the shaft 228. To accomplish this disconnection automatically, use is made of the same actuator 203 which tripped the carriage-return actuating mechanism at the completion of the return of the carriage. For this purpose, a branch 255 (Fig. 11) of the tubing 202 which leads to the control of the actuator 203, is connected to a valve 256, which is normally closed but openable when the desired extent of rotation of the platen has been accomplished. When this valve is opened, it admits air in the usual way to the controller of the actuator 203, so that the bellows motor collapses and shoots forwardly the thrust link 204, which, in addition to the pin 205, carries a second pin 257, arranged to engage one arm 258 (Fig. 11) of a bell crank lever, having a second arm 259 provided with a pin 260 underlying the plunger 243.

It will thus be seen that when the valve 256 is opened, it will raise the plunger 243, removing the notch 246 out of engagement with the latch 247, and removing the shoulder 245 out of engagement with the crotch 244, permitting the shifter 236 to return under the propulsion of the spring 237, to its disconnecting position, so that the shaft 228 will once more be silent, while the sprocket wheel 232 rotates idly. To open the valve 256, it is given a traveling movement coincident with the rotary movement of the platen and corresponding in extent to the extent of rotation of the platen desired. When the valve 256 completes its desired travel, it comes into engagement with a stop 261, which opens the valve and causes an operation of the actuator 203 as mentioned above. To traverse the valve 256, it is mounted on a carriage 262, which slides on ways or guide rods 263 of a rocking frame 264.

When the clutch element 235 is connected up to the clutch element 234 to drive the shaft 228, a pin 265 on the lever 240 engages an arm 266 on the rocking frame 264 to swing the same about its pivot against the tension of a spring 266$^a$ and thereby bring a tooth or segment of a nut 267 (Figs. 4 and 7) into engagement with a bodily stationary but rotating screw 268 secured to the shaft 228 (Fig. 15).

It will thus be seen that so long as the shaft 228 is rotated to drive the platen, the screw 268 will be rotating to feed the carriage 262 carrying the valve 256 along on the ways 263, until a flange 269 on the gate 270 of the valve comes into engagement with the stop or trip 261, whereby this gate will be swung against the tension of a spring 271, from a normally closed position to an open position, admitting air to the controller of the actuator 203. When this occurs, as mentioned above, the plunger 243 is released, opening the clutch elements 234, 235, thereby stopping the rotation of the shaft 228. The return movement of the lever 240 also permits a spring 266$^a$ to swing the frame 264 back to its normal position, disconnecting the tooth 267 from the screw 268, permitting the carriage 262 to be returned to its normal position, by a spring 272. When the valve 256 moves away from the stop 261, the spring 271 will automatically close the gate 270 thereof, permitting the actuator 203 to return to a normal condition. The stop 261 is adjustable so as to vary the extent of travel of the carriage 262 before the valve 256 is opened, and thus vary the period of driving connection to the platen, whereby the number of line-spaces which the platen is rotated, may be varied.

To adjust the stop or trip 261, it is in the form of a nut having a screw-threaded engagement with a rod 273 on which it is mounted. The rod 273 is provided with a knurled handle 274 and the stop 261 is also knurled, so that they may be rotated relatively to each other, whereby the position of the stop 261 along the rod 273 may be varied. It will thus be evident that the nearer the stop 261 is to the starting point in the travel of the valve 256, the sooner the drive to the platen will be interrupted.

In addition to rotating the platen to remove a completed work-sheet therefrom, the mechanism just described also rotates the platen to position a new clean work-sheet on the platen, so as to bring the point where it is desired to have the first typewriting in register with the printing point of the typewriter. Before this new sheet, however, can be set to proper position on the platen, it must be supplied to the platen. For this purpose, there is provided automatic work-sheet feeding mechanism, which will now be described.

The blank sheets are deposited in a stack in an open-faced receptacle 275 (Figs. 1, 8 and 9), the sides 276 of which are adjustable to accommodate sheets of different widths. To enable this adjustment of the sides, they are provided with arms 277, which extend through slots 278 in the back plate of the receptacle 275 and are secured to sleeves 279 adjustably mounted along a rod 280 (Fig. 6). The sides 276 are guided to keep the same in parallel relation with each other by means of lugs 281, which enter into slots 282 provided in the back plate of the receptacle 275. A sheet-lifter 283 normally hangs from pivot brackets 284, so that suction cups 285 rest on the uppermost sheet of the stack. The lifter 283 is in the form of a hollow bail and forms a conduit through which air is sucked, and thus enables the cups 285 to cause the uppermost sheet to adhere thereto. The interior of the bail 283 and the cups 285 are, however, under a suction only when it is desired to feed a new sheet to the platen. This action is controlled from the master sheet, which, when it has finished its work, brings a perforation therein into register with a corresponding aperture in the tracker board 40. This aperture is connected by a pipe or tube 286 (Fig. 1), which extends through the common suction bleeding chamber 45 and is provided with the usual bleed opening 46ª. This tube or pipe 286 continues on to the pneumatic controller 287. The controller 287 is the same as that shown in Fig. 5, but it does not control the supply of air to a bellows motor, such as is shown in Fig. 5. This controller 287 is merely used to control the suction on a pipe 288, which, like the connection 38 in Fig. 5, connects with the equalizing chamber 49, so that when this equalizing chamber 49 is under a suction, owing to the raising of the valve 50, when air is admitted to the lower compartment 44, it will also cause the air to be sucked out of the pipe 288. The pipe 288 is connected to the bottom end of a rigid tube 289 (Figs. 6, 8, 9 and 14), which tube extends up through a sleeve or standard 290 and is provided at its upwardly-protruding end, with a flexible rubber tube 291 (Fig. 8), which forms a means of communication with the interior of the bail 283, and is connected thereto along the pivot reach 292 thereof, which extends through the pivot brackets 284. It will be seen by this means that when the proper perforation in the master sheet 42 comes into register with the accordant aperture in the tracker 40, air will be sucked out of the bail 283, and hence cause a suction from the cups 285, so that the uppermost sheet of the stack supported by the receptacle 275 will be drawn to the cups 285 as indicated in full lines in Fig. 8. Before this sheet, however, can be deposited on the platen 7, it must be lifted clear of the lower supporting ledge of the receptacle 275. To accomplish this, use is made of the driving mechanism which rotates the platen, to remove the sheet previously written from the platen and to properly position the new sheet on the platen. The shaft 228 (Figs. 11, 14 and 15) which, as mentioned above, is rotated to drive the platen 7 a number of line spaces at a time, is provided at one end with a cam 293, which is shown in the form of a cylinder having on the end face thereof, an annular cam surface 294. The cam surface starts at a point and gradually slopes to a maximum height where it dips abruptly to the starting point. The cam 293 always when silent, occupies the same position, which may be termed the "home position," with the starting point of the cam surface 294 in contact with a follower roller 295 on an arm 296 (Fig. 14), which is fixed on the rigid tube 289, for which the sleeve 290 forms bearings in which the tube may oscillate. As the shaft 228 rotates, it rotates the cam 293, so as to gradually swing the arm 296 and thus gradually rock the rigid tube 289. This rocking motion is transferred to an arm 297, also secured to the rigid tube 289 at its upper end. The arm 297 is arranged to transmit its motion to a rocking frame 298, which is pivotally mounted on the rod 280. The arm 297 is provided with a pair of spaced pins 299, which engage on opposite sides of a rail 300 provided on the swinging frame 298, whereby the arm 297 may rock the frame 298 (Figs. 8 and 9). The swinging frame 298 imparts its movement by means of an arm 301, to the bail of the sheet-lifter 283, with which it engages by means of a pair of spaced pins 302. The rocking of the arm 296 by the cam 293 thus takes place when the shaft 228 rotates, whereby the sheet-lifter 283 is moved to the full-line position shown in Fig. 9, from the full-line position shown in Fig. 8, where it holds the uppermost sheet on the stack in a suspended position ready to drop it to the platen 7.

The parts are held in this position until the sheet has been dropped by cutting off the suction to the sheet-lifter 283 and admitting air thereto. To hold the sheet-lifter in its elevated position, a latch 303 (Fig. 14) is drawn by a spring 304 to engage a shoulder 305 of the arm 296 and hold it in a position corresponding to the raised position of the sheet-lifter 283, shown in dotted lines in Fig. 8. The suction is cut off from the sheet-lifter 283, so as to drop the sheet suspended to the platen, by the master sheet 42 traveling along to bring the opening therein out of register with the aperture in the tracker. After the work-sheet has been dropped from the lifter 283, the latch 303 may be released, permitting the return of the sheet-lifter 283 to a position with the cups 285 in engagement with the next work-sheet at the top of the stack in the receptacle 275. In order that the latch 303 may be released, it is secured to a rock shaft 306, which also has secured thereon an angular tripping arm 307, the end of which lies in the path of movement of the supporting frame 16 (Figs. 1, 4 and 14) for the universal frame 14 of the typewriter. It will be evident, then, as soon as any key of the typewriting mechanism is actuated by the operative, that the frame 16 will be shifted and thus swing the arm 307 to release the latch 303, permitting the arm 296 to swing to its normal position shown in Fig. 14, the cam 293 having, in the meantime, returned to its home position with the dip in register with the follower roller 295.

To bring the cam 293 to its home position after each actuation, there is loosely mounted on the shaft 228 (Figs. 13 and 15), a spool or drum 308, which has secured thereto one end of a coil spring 309, the other end of which is secured to a fixed portion of the frame 310.

As the shaft 228 rotates in the manner above mentioned, this motion will be transmitted to the drum 308 by means of a pair of friction disks 311 and 312, the former of which is secured to the shaft 228 and the latter of which is yieldingly pressed into engagement with one side of the spool 308 by a spring 313 abutting against a collar 314. It will be seen that the spring 313 normally tends to clamp the spool 308 between the clutch disks 311 and 312, so that the spool will tend to rotate the shaft 228, until the spring 309 is completely wound up. Then any further rotation of the shaft 228 will merely produce a slippage between the faces of the disks 311 and 312 and the heads of the spool 308. The strength of this friction clutch connection may be varied by adjusting the collar 314, which has a screw-threaded connection with the shaft 228.

It will therefore be seen that when the shaft 228 is disconnected from the source of power by the opening of the clutch comprising the elements 234, 235, it will be free to rotate and will be rotated by the spring 309, tending to unwind itself. The extent of this rotation is determined by a spring-pressed locating dog 315, which is pivotally connected at 316 with any part secured to the shaft 228, as, for example, the screw 268. This locating dog 315 is provided with a cam face 317 on one side so that when the shaft 228 rotates in the direction of the arrow in Fig. 12, which direction corresponds to the driving of the platen and the rotating of the cam 293 to raise the sheet-lifter 283, it will slip idly by an obstructing or locking rail 318. When, however, the shaft 228 rotates in a counter-clockwise direction (Fig. 12) under the impulse of the coil spring 309, the opposite abrupt face 319 of the dog 315 will come into engagement with the rail 318, preventing further motion of the shaft 228. The dog 315 is so positioned relatively to the shaft 228 and the cam 293, that when it brings the shaft 228 to a stop, it will always bring the dip of the cam surface 294 into register with the follower 295, so that the arm 296 will be free to return to the position shown in Fig. 14. It will be seen that this action will be positive no matter how much the shaft 228 has been rotated and no matter where it stops in its rotation, as the dog will always bring it up hard at the same point on its return motion.

The new work-sheet dropped to the platen is guided thereto so that it will come with the bottom edge in even register with the bight of the platen. To do this, there is mounted on the carriage 8 (Fig. 10), a sheet-guide 320. This guide may include a pair of chutes 321 and 322 having open sides facing each other and having their fronts and rears sloping downwardly toward each other so as to come quite close together near the bottom, whereby the sheet will be accurately directed to the bight of the platen. The rear of the chutes 321 and 322 may extend some little distance beyond the front part thereof and contact with the paper shelf surrounding the platen so as to prevent a swinging movement of the guide as a whole.

The chutes 321 and 322 may be adjustably mounted by means of brackets 323 on a rail 324, so that they can be brought closely together to accommodate small widths of paper, or stretched away from each other to accommodate wide sheets. The brackets 323 may be locked in any adjustable position along the rail 324 by set screws 325. The rail 324 has connected thereto, by means of uprights 326, a cross-bar 327, which forms a support for a deflector 328. This deflector engages the top edge of the work-sheet as it comes from the platen and swings it toward the front of the typewriting machine, so that as the platen rotates to free itself from the work-sheet after the typewritten matter has been completely written thereon, the sheet will shoot forwardly as indicated in Fig. 1, into a receptacle or basket placed in front of the typewriter. Where the chutes 321 and 322 are spread somewhat widely from each other, the sheet coming thereto might bulge at the middle. To prevent this and properly guide the sheet, there is provided a looped deflector 329 located midway of the chutes 321 and 322, and supported by the cross-bar 327.

As has been mentioned above, the limit of travel of the carriage can be varied so that the position of the stops on its return motion may vary. Inasmuch as the fresh sheet is fed to the carriage when it has reached the limit of its return movement, it is necessary to have the guide 320 come to a point where it will receive the sheet directly from the lifter 283. If the variation in the stopping point of the carriage on its return motion is very great, the difference can be accommodated by bodily adjusting the receptacle 275 which holds the stack of fresh sheets. To enable this adjustment, the sleeve 290 (Figs. 6 and 14) supports dovetail grooved ways 330 in which extends a correspondingly formed rail 331 mounted on the back of the receptacle 275. The rail 331 may be slid in the ways 330 to any position desired, whereby the receptacle 275 will be correspondingly located. When so adjusted the receptacle and the rail 331 may be locked by set-screws 332.

It will be noted that the engagement of the lever 297 with the swinging frame 298, by means of the pins 299 and the rail 300, permits of this relative movement without disturbing the capacity of the lever 297, to rock the sheet-lifter 283 through the intermediary of the swinging frame 298. That is to say, the operative connection to the lifter 283 is not disturbed no matter what the position of the receptacle 275 along its support.

In considering the operation of the device, it will be assumed that a letter has been completely written on a work-sheet on the platen and we are about to repeat this letter with a new name and address. The master sheet 42 (Fig. 1) is in control and the feeding mechanism therefor in operation, while the feeding mechanism for the master card is silent and a blank or solid portion of the master card in place is opposite to the apertures in the tracker 41. As the master sheet 42 is fed past its tracker 40, it brings a perforation into register with a corresponding aperture in the tracker 40, which controls the operation of the pneumatic actuator 191, whereby the clutch-shifting lever 188 will be operated to bring the clutch element 185 into engagement with the clutch element 184, so as to enable a carriage-return movement. This is to insure the carriage being at the end of its return movement in a position to receive a new work-sheet from the sheet-feeding mechanism.

When the carriage-return mechanism comes into play it automatically raises the gear 64 out of mesh with the gear 63, through the intermediary of the bar 116, the link 118 and the arm 120 (Figs. 2 and 11), so that the drive to the master sheet is silenced. When, however, the carriage reaches the end of its return movement, the trip thereon engages the stop 198 and opens the valve 199, so as to excite to action the pneumatic actuator 203, whereby the link 192 will be tripped to permit the unclutching of the sprocket wheel 171 from the shaft 26, thereby interrupting the drive to the carriage-return mechanism. This will permit the bar 116 to return to its normal position, thereby permitting the gear 64 to drop into mesh with the gear 63, continuing the feed of the master sheet. The master sheet will thus be moved along to bring two new perforations into play, one corresponding to the rotation of the platen so as to remove the work-sheet already on the platen, and the other corresponding to the picking up of a fresh sheet of paper by the sheet lifter 283. The first of these perforations excites the actuator 242 to action, so that it thrusts forwardly the plunger 243 to rock the lever 240, which actuates the clutch-shifter 236 against the tension of the spring 237, to connect the shaft 228 in driven relation with the continuously-rotating sprocket 232. The shaft 228 on being driven, rotates through the connecting gearing, the platen 7 any predetermined amount, so as to remove, or at least partially remove, the completely written work-sheet from the platen to deposit it in the basket or receptacle in front of the typewriter. The extent of this rotation is determined by the distance traveled by the valve 256 before it comes into engagement with the stop or trip 261, which has been previously adjusted for a rotation of the platen corresponding to any desired number of line spaces. The opening of the valve 256 excites the same actuator 203 to action, which was excited to action at the end of the carriage return, so that the driving connection to the feeding mechanism for the master sheet, which was also interrupted at the starting of the platen into rotation, will be once more completed.

As stated above, a second aperture was brought into play at the same time as that controlling the rotation of the platen. This excited the pneumatic control 287, so that it raised the valve therein to open up communication between the pipe 288 and the source of suction, whereby the sheet-lifter 283 and the suction cups 285 were enabled to cause the uppermost sheet of the stack in the receptacle 275 to adhere to the sheet-lifter 283. After this has occurred and as the shaft 228 starts in rotation, the cam 293 will be rotated to swing, through the interconnecting mechanism, the sheet-lifter 283, to its raised position shown in dotted lines in Fig. 8, ready to drop the fresh work-sheet to the platen. The sheet-lifter 283 is locked in this position by the latch 303 until such subsequent time as any of the keys of the typewriter are actuated.

As stated above, the feed to the master sheet is interrupted while the platen is being rotated through the rotation of the shaft 228. Hence, the perforation which caused the suction in the sheet-lifter 283, stops in register with its aperture and remains there until the rotation of the platen has ceased and until the sheet-lifter is raised to the dotted-line position shown in Fig. 8.

When these acts have been accomplished and the rotation of the shaft 228 ceases, the pneumatic actuator 203 not only interrupts the drive to the shaft 228 but also permits the feeding mechanism of the master sheet 42 to come once more into action thereby feeding the two perforations which were in register with their corresponding apertures, to pass by the same. This, in addition to silencing the actuator which connected up the platen in driven relation with the source of power, also silences the control 287, so that the valve thereof cuts off communication between the pipe 288 and the source of suction, connecting the same with the outside atmosphere. When this occurs, the suction will be relieved in the sheet-lifter 283, so that the same is free to drop the suspended sheet into the guide 320 and thus to a position with the bottom edge in register with the bite of the platen.

As the master sheet feeds along, it brings a second platen-rotating perforation into register with its aperture, so that the shaft 228 is once more rotated to finish the discharge of the previously written work-sheet if it has not already been entirely fed from the platen, and advance the new work-sheet around the platen 7, to bring the desired line to be written on to the printing point. The valve 256 once more silences the drive to the platen 7 and enables the further feeding of the master sheet 42.

While the shaft 228 was rotating, it tensioned the spring 309 (Fig. 13), so that as soon as the shaft 228 was disconnected from the source of drive, it was rotated in a counter-direction by the spring 309, through the friction clutch which connects the spool 308 with the shaft 228, so that the positioning dog 315 is enabled to stop the shaft 228 at a definite point corresponding to the location of the dip in the cam surface 294 in register with the follower 295. This enables the return of the sheet-lifter 283 and operating mechanism thereof to a normal position when subsequently released from the hold of the latch 303 at the first operation of any key of the typewriting mechanism 2.

As the master sheet 42 is now fed on, it brings the desired number of tabulating perforations in succession into register with the corresponding aperture in the tracker 40, so that the tabulating key, not shown in the drawings, will be operated a corresponding number of times in succession. This will space the carriage 8 with the aid of the tabulating stops on the back of the carriage, which have been previously located, to bring the point on the work-sheet where it is desired to strike the first letter of the date, to the printing point of the typewriter. As the master sheet feeds on, it will bring a " shift on " perforation into register with its aperture which causes the actuation of a quasi-permanent case-shift key, so as to lift the platen to write upper-case characters and hold it there. The next perforation coming into play is the one which operates the " o " key, so that the capital " o " (O) will be struck. It will be noted in passing that the striking of this letter causes the corresponding type-bar to shift the universal bar 14 of the type-writing machine, so that the supporting frame 16 thereof will be rocked, hitting the arm 307, whereby the latch 303 will be moved from engagement with the arm 296, permitting the return of this arm and the sheet-lifter 283 actuated thereby to their normal positions. A further feed of the master sheet brings a perforation into register with its aperture, which will cause the operation of the temporary shift key, whereby the permanent shift key will be released in the usual manner to once more permit the writing of lower-case characters. This action is continued until the date is written. A carriage-return perforation will then come into play, causing the return of the carriage to its starting position. A further feed of the master sheet brings a " control-change " perforation into register with its aperture, so that the pneumatic actuator 106 (Fig. 1) is brought into play to silence the master-sheet control and incite to action the card-control. This first releases the link 107 and then forces over the lever 101 from the Fig. 1 position, whereby the driving mechanism for the feeding rollers to the master sheet 42, will be disconnected. That is to say, the gear 64 will be lifted out of mesh with the gear 63, while the driving mechanism for the card-feeding mechanism will be brought into play; or, in other words, the card-feeding rollers 89, 91 will be started into action. The master card in place now starts down past its tracker 41. This card will be placed in the mechanism in the position upside down, as the feed is downward. For example, the name and address " John Doe, 30 Vesey St., New York, N. Y." is now to be written. The first perforation coming into play will be the " shift on " perforation, that is the one which actuates the permanent shift key, and then the letter " J " perforation followed by the " shift off " perforation or the one which operates the temporary shift key that releases the permanent shift key, and so on, until the name " John Doe " is written. The carriage-return perforation then comes into play, which automatically causes not only the return of the carriage to its starting point but also the line-spacing of the platen, whose line-space lever 21 is operated by the carriage-return draw-band 174, through the intermediary of the connector 179. The tabulating perforation next comes into action, so as to strike the tabulating key once to space for the beginning of the address " 30 Vesey St." This, then, is written by the successive perforations coming into play at proper intervals.

The carriage is once more returned and the work-sheet spaced, when the tabulating key will be struck twice under the control of two successive tabulating perforations, so as to indent a little farther for "New York, N. Y." This, likewise, is written by the successive passage of the several perforations past the corresponding apertures in the tracker 41. After this line has been written the carriage is once more returned and the master card fed on subsequently thereto. Two perforations now come into play at the same time, one controlling the shifting from control by the master card to control by the master sheet, and the other governing the exchange of the card in action for a new card. That is to say, it governs the operation of a card-substitutor. The first of these two perforations causes an operation of the pneumatic actuator 105, which draws on the link 107, to first cam up the thrust link 110 to its disengaged position, and then by itself engaging the lug 109, rock the lever 101 to the position shown in Fig. 1, which corresponds to the disconnection of the drive to the card-feeding mechanism and the connection of the drive to the master-sheet-feeding mechanism. While the master sheet is in control, the card-substitutor will be acting as started by the perforation coming into play at the same time that the one which shifted the control to the master-sheet, so that a new card will be brought down by suitable mechanism, including a card-substitutor, so as to force cut the card which has finished its action, and bring in place thereof, a new card corresponding to a new name and address. The rollers 89 and 91 will be opened up at the proper time, to admit of the insertion of this new card and the card-substitutor will be returned automatically to its normal position, after having finished its work. Meanwhile, the master sheet 42 continues its action, writing the body of the letter commencing "Dear Sir."

After the body of the letter has been finished, the master sheet, which is endless, once more brings the perforations around, which control the removal of the written work-sheet and the supplying of a new work-sheet to the platen. This action is repeated over and over again, the master sheet alternating in control with the master cards, a new master card being substituted for each operation of the master sheet, so that any number of letters may be written having substantially the same subject matter with different names and addresses.

Of course, a change may be made from the master sheet to the master card, and vice versa, at any point in the writing of the letter. For example, the date may be put at the bottom of the letter, or the name of the person to whom the letter is directed, or other matter might be inserted in the midst of the subject matter of the letter, so as to make the same appear somewhat more personal. To accomplish these objects, it is merely necessary to place the "control change" perforations at the proper points.

Variations may be resorted to within the scope of the invention, and portions of the improvements may be used without others.

Having thus described my invention, I claim:

1. The combination with a platen, of driving means for rotating said platen, a sheet-feeder for supplying work-sheets to said platen, and actuating means for said sheet-feeder operated from said platen-rotating means.

2. The combination with a platen, of a sheet-feeder for supplying a work-sheet to said platen, actuating means for said sheet-feeder, and the same driving means for concomitantly rotating both said platen to remove a completed work-sheet and operating said actuating means to supply a fresh sheet to said platen.

3. The combination with a traveling carriage, of a platen rotatably mounted on said carriage, a sheet-feeder for supplying work-sheets to said platen, and actuating mechanism for operating said sheet-feeder, said sheet-feeder being adjustable relatively to the travel of said carriage and relatively to said actuating mechanism, said actuating mechanism having a connection to said sheet-feeder universal to all positions of adjustment of said sheet-feeder.

4. The combination with a traveling carriage, of a platen rotatably mounted on said carriage, a sheet-feeder for supplying work-sheets to said platen, actuating mechanism for said sheet-feeder, a receptacle for holding fresh work-sheets to be supplied to said platen, said carriage being capable of traveling to varying limits and said receptacle being movable to different positions to correspond to the different limits of travel of said carriage, said receptacle forming a mounting for said sheet-feeder, and a connection between said actuating mechanism and said sheet-feeder universal to all positions of adjustment of said sheet-feeder with said receptacle.

5. The combination with a traveling typewriter carriage, of a platen rotatably mounted on said carriage, a sheet-feeder for supplying work-sheets to said platen, and a receptacle for holding the work-sheets to be supplied to said platen, said carriage having a variable limit of travel, and said receptacle being adjustable to accommodate the varying limits of travel of said carriage and also adjustable itself to correspond with different sized work-sheets.

6. The combination with a platen, of a sheet-lifter for supplying work-sheets to said platen, a frame for rocking said sheet-lifter, including an arm having a loose connection with said sheet-lifter, a rail on said frame, and an arm having a sliding connection with said rail for rocking said frame, said sheet-lifter and said frame being adjustable relatively to said arm to accommodate different positions of said platen.

7. The combination with a platen, of a sheet-lifter for supplying work-sheets to said platen, including a suction bail, said sheet-lifter being adjustable to accommodate different positions of said platen, a swinging frame having an arm with a loose connection with said bail to actuate said bail, a rail on said frame, and an arm for rocking said frame, having a pair of pins straddling said rail, so as to form a sliding connection therewith universal to all positions of said sheet-lifter.

8. The combination with a platen, of a sheet-lifter for supplying work-sheets to said platen, including a pivotally mounted suction bail, a receptacle for holding the work-sheets to be supplied to said platen, a standard for supporting said receptacle and said lifter, and actuating mechanism for said sheet-lifter extending up through said standard.

9. The combination with a platen, of a sheet-lifter for supplying work-sheets to said platen, a receptacle for holding the work-sheets to be supplied to said platen, a standard for supporting said receptacle and said sheet-lifter, and actuating mechanism for said sheet-lifter extending up through said standard.

10. The combination with a platen, of a sheet-lifter for supplying work-sheets to said platen, a receptacle for holding the work-sheets to be supplied to said platen, a standard for supporting said receptacle and said sheet-lifter in a position above said platen, and means extending up through said standard creating a suction on said sheet-lifter and for rocking said sheet-lifter.

11. The combination with a platen, of a hollow suction bail for lifting sheets to be supplied to said platen, a tube forming a conduit for drawing the air from said bail, and linkages connecting said tube with said bail, whereby said tube may rock said bail to move work-sheets adhering to said bail by the withdrawal of air from said bail.

12. The combination with a platen, of a sheet-lifter for supplying work-sheets to said platen, said sheet-lifter being in the form of a hollow suction bail having suction cups thereon, and a rigid tube forming a conduit for withdrawing air from said bail and also forming an element in a train of connections for rocking said bail.

13. The combination with a platen, of a sheet-feeder for supplying work-sheets to said platen, a receptacle for supporting the work-sheets to be supplied to said platen, a standard for supporting said receptacle and said sheet-feeder, and a rigid tube extending up through said standard connected to withdraw air from said sheet-feeder, and also connected to rock said sheet-feeder.

14. The combination with a platen, of a sheet-feeder for supplying work-sheets to said platen, a receptacle for holding work-sheets to be supplied to said platen, a standard for supporting said receptacle and said sheet-feeder in a position above said platen, a rigid tube extending up through said standard, a tubular connection between said tube and said feeder enabling the withdrawal of air from said feeder to suck up a sheet to said feeder, a linkage connection between said rigid tube and said sheet-feeder enabling the rocking of said sheet-feeder by said tube, means for exhausting the air from said rigid tube, and means for rocking said rigid tube.

15. The combination with a traveling carriage, of a platen rotatably mounted on said carriage, automatic means for supplying a work-sheet to said platen, operable at the end of return movement of said carriage, means for adjusting the limit of return movement of said carriage, and means for adjusting said sheet-supplying means to correspond with the variation in the limit of return movement of said carriage.

16. The combination with a platen, of sheet-feeding mechanism for supplying a work-sheet to said platen, actuating means for giving parts of said sheet-feeding mechanism a definite movement, varying driving mechanism for operating said actuating means, and equalizing mechanism for accommodating the varying drive to the definitely moving actuating means.

17. The combination with a platen, of sheet-feeding mechanism for supplying work-sheets to said platen, actuating means for said sheet-feeding mechanism, driving mechanism for operating said actuating means, having a variable movement, and equalizing means for locating said actuating means after an operation thereof, always at the same relation.

18. The combination with a platen, of a sheet-feeder for supplying work-sheets to said platen, a linkage for operating said sheet-feeder, a cam for actuating said linkage, variable driving mechanism for said cam, and localizing means for always returning said cam to the same relation with said linkage irrespective of the extent of movement of said driving mechanism.

19. The combination with a sheet-feeding mechanism, of a cam for actuating said sheet-feeding mechanism, a variable drive for said cam, and a spring for returning said cam always to the same relative position with respect to said sheet-feeding mechanism irrespective of the extent of movement of the cam.

20. The combination with a sheet-feeding mechanism, of a cam for actuating said sheet-feeding mechanism, a variable drive for said cam, a spring tensioned by said variable drive at a rotation of said cam and acting to return said cam after the driving action has ceased, and a stop for determining the extent of return movement of said cam by said spring.

21. The combination with a sheet-feeding mechanism, of a cam for actuating said sheet-feeding mechanism, driving means for said cam, and a spring having a slip connection with said driving means, being tensioned during a positive action of said cam, to return said cam to its starting position after said driving means has ceased to act.

22. The combination with a sheet-feeding mechanism, of a cam for actuating said sheet-feeding mechanism, driving means for said cam, a spring drum for returning said cam to its starting position, and a slip clutch connection between said driving means and said spring drum.

23. The combination with a sheet-feeding mechanism, of a cam for actuating said sheet-feeding mechanism, driving means for said cam, spring means for returning said cam to a starting position, a slip clutch connection between said spring means and said driving means, and a one-way acting stop ineffective during a positive drive of said cam, and acting during a drive of said cam by said spring, to determine the limit of return movement of said cam.

24. The combination with a platen, of a sheet-lifter for supplying a work-sheet to said platen, a frame for rocking said sheet-lifter, an arm for rocking said frame, a shaft swinging said arm, a second arm for rocking said shaft, and a cam for swinging said second-mentioned arm.

25. The combination with a platen, of a sheet-lifter for supplying a work-sheet to said platen, a frame for rocking said sheet-lifter, an arm for rocking said frame, a shaft swinging said arm, a second arm for rocking said shaft, a cam for swinging said second-mentioned arm, means for driving said cam, and means for returning said cam after an actuation to a definite relation with respect to said second-mentioned arm.

26. The combination with a sheet-feeding mechanism, of a cam for actuating said sheet-feeding mechanism, and locking means for holding said sheet-feeding mechanism in its actuated position until said cam has returned to the same relation with respect to said sheet-feeding mechanism from which it started.

27. The combination with a platen, of a sheet-feeding mechanism for supplying work-sheets to said platen, a cam for actuating said sheet-feeding mechanism, locking means for maintaining said sheet-feeding mechanism in its actuated condition, and releasing means for said locking means acting at the first traveling movement of said platen subsequently to the actuation of said sheet-feeding mechanism.

28. The combination with a traveling carriage, of a platen rotatably mounted on said carriage, sheet-feeding mechanism for supplying a fresh work-sheet to said platen including a work-sheet receptacle in which the fresh work-sheets may be stacked, said receptacle being adjustable as to dimensions to accommodate different sizes of work-sheets, and a guide mounted for movement with said carriage, located intermediate said platen and said sheet-feeding mechanism, so as to direct the work-sheets to said platen, said guide being adjustable as to its dimensions to correspond with the adjustment of said receptacle.

29. The combination with a traveling carriage, of a platen rotatably mounted on said carriage, sheet-feeding mechanism extraneous to said carriage for supplying fresh work-sheets to said platen, said sheet-feeding mechanism being adjustable with respect to said carriage, so as to feed work-sheets to said platen at different positions of said carriage, and guiding means mounted for movement with said carriage and located intermediate said platen and said sheet-feeding mechanism, said guiding means being adjustable along said carriage to correspond with different positions of adjustment of said sheet-feeding mechanism.

30. The combination with a traveling carriage, of a platen rotatably mounted on said carriage, said carriage having variable limits of travel, and sheet-feeding mechanism extraneous to said carriage for supplying work-sheets to said platen at one of the limits of travel of said carriage, said sheet-feeding mechanism being adjustable bodily to correspond with the different limits of travel for which said carriage is set.

31. The combination with a traveling carriage, of a platen rotatably mounted on said carriage, said carriage having variable limits of travel, sheet-feeding mechanism extraneous to said carriage for supplying work-sheets to said platen at one of the limits of travel of said carriage, said sheet-feeding mechanism being adjustable bodily to correspond with the different limits of travel for which said carriage is set, and guiding means for work-sheets mounted for movement on said carriage, and located intermediate said platen and said sheet-feeding mechanism.

32. The combination with a traveling carriage, of a platen rotatably mounted on said carriage, said carriage having variable limits of travel, sheet-feeding mechanism extraneous to said carriage for supplying work-sheets to said platen at one of the limits of travel of said carriage, said sheet-feeding mechanism being adjustable bodily to correspond with the different limits of travel for which said carriage is set, guiding means for work-sheets mounted for movement on said carriage and located intermediate said platen and said sheet-feeding mechanism, and means for adjusting said guiding means for said carriage to accommodate the work-sheets coming from said sheet-feeding mechanism.

33. The combination with a carriage, of a platen mounted on said carriage, a pair of open-sided chutes adjustable relatively to each other, mounted on said carriage for guiding work-sheets to said platen, and a deflector arching from the front forward of said platen for diverting work-sheets coming from said platen.

34. The combination with a platen, of a sheet-feeder for supplying work-sheets to said platen, driving means for rotating said platen, controlling means enabling said sheet-feeder and said driving means to be controlled from a master-member having perforations therein, and an inter-connected actuating means governed by said controlling means and operating said driving means and said sheet-feeder, whereby said sheet-feeder and said driving means may be brought into play by a single perforation in said master-member.

LYMAN R. ROBERTS.

Witnesses:
 EDITH B. LIBBEY,
 CATHERINE A. NEWELL.